United States Patent [19]

Nillesen et al.

[11] Patent Number: 4,514,754
[45] Date of Patent: Apr. 30, 1985

[54] DIGITAL COLOR TELEVISION SIGNAL PROCESSING CIRCUIT

[75] Inventors: Antonius H. H. J. Nillesen; Petrus W. G. Welles, both of Eindhoven, Netherlands

[73] Assignee: U.S. Philips Corporation, New York, N.Y.

[21] Appl. No.: 469,545

[22] Filed: Feb. 25, 1983

[30] Foreign Application Priority Data

Mar. 5, 1982 [NL] Netherlands ................... 8200901

[51] Int. Cl.³ ............................................. H04N 9/32
[52] U.S. Cl. .......................................... 358/13; 358/19
[58] Field of Search ......................... 358/13, 16, 19; 375/119, 120, 110; 328/135, 139; 331/18, 20

[56] References Cited

U.S. PATENT DOCUMENTS 4,122,487 10/1978 Beaulier et al. .................. 358/13
4,291,332 9/1981 Kato et al. ........................ 358/19

OTHER PUBLICATIONS

Thomas Fischer, "Digital VLSI Breeds Next-Generation TV Receivers", *Electronics*, Aug. 11, 1981, pp. 97–103.

Primary Examiner—John C. Martin
Assistant Examiner—Michael Dunnam
Attorney, Agent, or Firm—Thomas A. Briody; William J. Streeter; Edward W. Goodman

[57] ABSTRACT

In a phase control loop (3, 15, 85, 87, 89, 90) for the A/D converter of a digital color television signal processing circuit an input (13) and an output (23) of a delay circuit (21) are connected to a comparator (19) to derive a control signal from the inequality of the signals at said input and output.

6 Claims, 3 Drawing Figures

DIGITAL COLOR TELEVISION SIGNAL PROCESSING CIRCUIT

BACKGROUND OF THE INVENTION

The invention relates to a digital colour television signal processing circuit comprising an analogue-to-digital converter which is controlled by a pulse generator producing a pulse signal of four times the chrominance subcarrier frequency, a comparison circuit being coupled to the output of the analogue-to-digital converter for comparing different digital burst samples and for obtaining therefrom a control signal for a phase control loop of the pulse generator.

Electronics, Aug. 11, 1981, pages 97–103 describes a colour television signal processing circuit of the above-mentioned type in which samples of the two quadrature components of the burst are compared in order to obtain a control signal which is a measure of the phase difference between the burst and the pulse signal controlling the analogue-to-digital converter. To obtain such a control signal, a function generator (ROM) and an accurate amplitude control are required in order to have the input signal of the function generator maintain the correct amplitude.

SUMMARY OF THE INVENTION

It is an object of the invention to avoid the use of such a function generator and amplitude control.

According to the invention, a digital colour television signal processing circuit of the type described in the opening paragraph, is characterized in that the burst samples to be compared are obtained from an input and an output of a delay circuit having such a delay that at a correct pulse generator phase the difference between the burst samples at the input and at the output thereof becomes zero, while the comparison circuit is an inequality detection circuit for detecting, independently of the amplitude value of the burst samples, inequality of the amplitude values of the burst samples at the input and at the output of the delay line and for converting that inequality, if present, into a control signal.

DESCRIPTION OF THE DRAWINGS

That this object is accomplished by means of the measure in accordance with the invention will now be described, by way of example, with reference to the accompanying drawings, In the drawings.

DESCRIPTION OF THE PREFERRED EMBODIMENT

Figure 1:
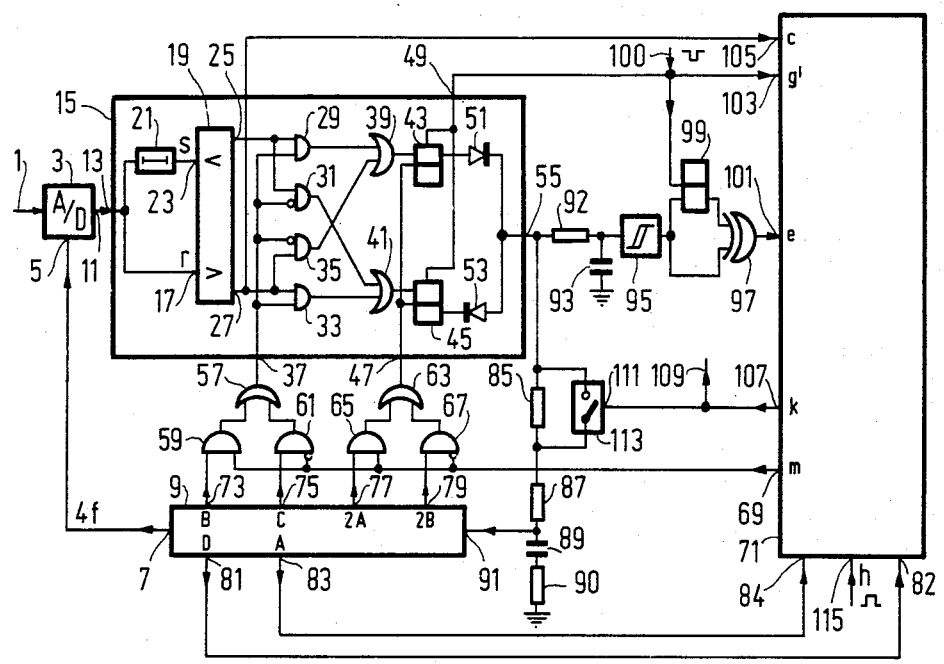
FIG. 1 illustrates by means of a block circuit diagram a digital colour television signal processing circuit in accordance with the invention.
Figure 3:
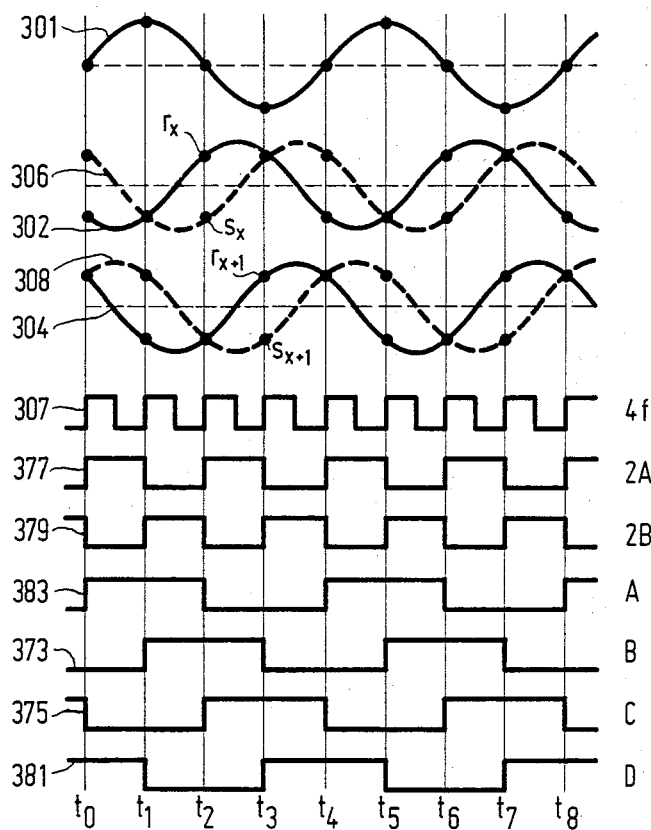
FIG. 3 illustrates the operation of the circuit diagram of FIG. 1 by means of a number of waveforms.

In FIG. 1, there is applied to an input 1 of an analogue-to-digital converter 3 a colour television signal comprising a quadrature-modulated chrominance subcarrier signal, the zero phase component of which is illustrated in FIG. 3 by the waveform 301. Let it be assumed that the chrominance subcarrier signal is a PAL-signal. The signal comprises a burst which during a horizontal blanking period x has a phase of 135°, as illustrated by the waveform 302 of FIG. 3 and during the subsequent horizontal blanking period x+1 has a phase of 225° as illustrated by the waveform 304 of 3.

A pulse signal from an output 7 of a pulse generator 9 is applied to an input 5 of the analogue-to-digital converter 3. This pulse signal has a frequency which is four times the chrominance subcarrier frequency and will be denoted $4f$ hereinafter.

The signal $4f$ is illustrated in FIG. 3 by means of the waveform 307. On the positive edges of this signal, which occur at the instants $t_0, t_1, t_2, t_3, t_4, t_5, t_6, t_7, t_8$ shown in FIG. 3, the signal at the input 1 is sampled by the analogue-to-digital converter 3 and converted into a digital signal which in the period which the instant initiates is supplied from an output 11 of the analogue-to-digital converter 3 and applied to an input 13 of an inequality detection circuit 15. From this input 13 the digital signal is applied to an input 17 of a comparator 19 and to an input 23 of this comparator 19 via a delay circuit formed by the delay line 21 having a time delay equal to one sampling period $\tfrac{1}{4f}$.

In consecutive horizontal blanking periods the signal at the input 17 of the comparator 19 corresponds to the samples at the instants $t_0, t_1, \ldots$ of the waveform 302 and 304, alternately and at the said instants the signal at the input 23 corresponds to the samples of waveforms 306 and 308, alternately, of FIG. 3.

In FIG. 3 it is assumed that the phase of the waveform 307 of the signal $4f$, and consequently of the further output signals of the pulse generator 9, is the correct phase. Then, at the instants $t_1, t_3, t_5, t_7$ in one horizontal blanking period and at the instants $t_0, t_2, t_4, t_6, t_8$ in the alternate horizontal blanking period the sampled value at the input 17 is equal to the sampled value at the input 23 of the comparator 19. If the phase of the pulse signal 4f having the waveform 307 is not correct, then the comparator 19 will detect inequality. The comparator 19 operates serially, in a similar manner as the comparator described in the U.S. Pat. No. 4,152,698. At one of its outputs 25 or 27 a signal is produced which has the logic value 1 at the end of the period which follows after the sampling operation. When the amplitude value at the input 17 is less than the value at the input 23, a one-signal is supplied from the output 25 and when the amplitude value at the input 17 is larger than the value at the input 23 the output 27 supplies a one-signal. In this situation it is assumed that the signals 302, 304, 306 and 308 are wholly located above the zero level.

The output 25 of the comparator 19 is connected to inputs of an AND-gate 29 and an AND-gate 31, while the output 27 of the comparator 19 is connected to inputs of an AND-gate 33 and an AND-gate 35. The other inputs of the AND-gates 31 and 35 are inverting inputs and, as are also the other inputs of the AND-gates 29 and 33, are connected to an input 37 of the inequality detection circuit 15.

The outputs of the AND-gates 29 and 35 are connected to the inputs of an OR-gate 39 and the outputs of the AND-gates 31 and 33 are connected to the inputs of an OR-gate 41. The output of the OR-gate 39 is connected to a D-input of a D-flip-flop 43 and the output of the OR-gate 41 is connected to the D-input of a D-flip-flop 45. The D-flip-flops 43 and 45 receive a clock signal from an input 47 and a reset signal from an input 49 of the inequality detection circuit 15. The reset signal maintains the D-flip-flop in the zero state in the period of time between two consecutive chrominance subcarrier bursts.

The non-inverting output of the D-flip-flop 43 is connected via a diode 51, and the inverting output of the D-flip-flop 45 via a diode 53, which is reverseconnected compared with the diode 51, to an output 55 of the inequality detection circuit 15.

The input 37 of the inequality detection circuit 15 is connected to the output of an OR-gate 57, the inputs of which are connected to the outputs of two AND-gates 59 and 61. The input 47 of the inequality detection circuit 15 is connected to the output of an OR-gate 63, the inputs of which are connected to the outputs of two AND-gates 65 and 67.

A switching signal m of half the horizontal deflection frequency is applied from an output 69 of a state detection circuit 71 to an input of the AND-gates 59 and 65 and to an inverting input of the AND-gates 61 and 67. The other inputs of the AND-gates 59, 61, 65 and 67 are connected to outputs 73, 75, 77 and 79, respectively, of the pulse generator 9, further outputs 81 and 83 of which are connected to inputs 82 and 84, respectively, of the state detection circuit 71.

The waveforms of the signals at the outputs 73, 75 77, 79, 81 and 83, respectively, of the pulse generator 9 are illustrated in FIG. 3 and denoted by the reference numerals 373, 375, 377, 379, 381 and 383, respectively.

For the sake of clarity, the signals at the inputs 17 and 23, respectively, of the comparator 19 will be denoted by r and s, respectively, and the signals at the outputs 7, 77, 79, 83, 73, 75 and 81, respectively, of the pulse generator 9 by $4f$, 2A, 2B, A, B, C and D, respectively.

During the horizontal blanking period x, the samples $r_x$ and $s_x$ of the waveforms 302 and 306 of FIG. 3 occur at the inputs 17 and 23, respectively, of the comparator 19 and during the subsequent horizontal blanking period $x+1$ the signal samples $r_{x+1}$ and $s_{x+1}$ of the waveforms 304 and 308 occur, respectively.

When the switching state in the state detection circuit 71 is the correct state, the output 69 thereof becomes one during the horizontal blanking period x and zero during the horizontal blanking period $x+1$. In response thereto, the signal B is applied to the input 37 of the inequality detection circuit 15 during the blanking period x and the signal C during the blanking period $x+1$.

If the phase of the signal $4f$ lags or leads, respectively, somewhat the zero phase 301 of the chrominance subcarrier, then the sampling instants $t_0, t_1 \ldots$ shift in FIG. 3 to the right or to the left, respectively.

In the period x the sampling instants $t_1, t_3, t_5, t_7$ are of importance and in the period $x+1$ the sampling instants $t_0, t_2, t_4, t_6$, as at these instants, with a correct phase of $4f$, the difference between $r_x$ and $s_x$ or $r_{x+1}$ and $s_{x+1}$, respectively, is zero.

If the phase of the signal $4f$ lags somewhat behind the zero phase, then in the period x, at $t_1$ and $t_5$ it is obtained that $r_x > s_x$ and at $t_3$ and $t_7$ it is obtained that $r_x < s_x$. Then a sampling period delayed there appears at the output 27 at $t_2$ and $t_6$ and at the output 25 at $t_4$ and $t_8$ a logic one signal. As then the signal B is present at the input 37 of the inequality detection circuit 15, a logic one signal becomes available at the output of the OR-gate 41 at the instants $t_2, t_4, t_6$ and $t_8$ and a logic zero signal at the output of the OR-gate 39.

In the period $x+1$ it is obtained at $t_0$ and $t_4$ that $r_{x+1} < s_{x+1}$ and at $t_2$ and $t_6$ and $r_{x+1} > s_{x+1}$. Then a logic one signal appears at the output 25 at $t_1$ and $t_5$ and at the output 27 at $t_3$ and $t_7$. As then the signal C is present at the input 37 of the inequality detection circuit 15, a logic one signal becomes available at the output of the OR-gate 41 at the instants $t_1, t_3, t_5$ and $t_7$ and a logic zero signal at the output of the OR-gate 39.

In the period x there appears at the input 47 of the inequality detection circuit 15 the signal 2A and in the period $x+1$ the signal 2B. In response thereto, in the period x the output signals of the OR-gates 39 and 41 are written into the D-flip-flops 43 and 45 at the instants $t_2, t_4, t_6, t_8$ and in the period $x+1$ at the instants $t_1, t_3, t_5, t_7$.

In the situation in which it is assumed that the phase of the signal $4f$ lags somewhat, the output of the flip-flop 43 becomes zero, as does also the output of the flip-flop 45. The diode 51 is then cutoff and the diode 53 conducts, as a result of which a capacitor 89 connected to the output 55 of the inequality detection circuit 15 discharges via resistors 85 and 87. The other side of the capacitor 89 is connected to ground via a resistor 90.

If the phase of the signal $4f$ leads somewhat, it can be demonstrated in the same way that the outputs of the flip-flops 43 and 45 become logic one, causing the diode 51 to conduct and the diode 53 to become nonconductive and the capacitor 89 to be charged.

Thus, a control signal is obtained from the capacitor 89 which is applied to a control signal input 91 of the pulse generator 9, as a result of which the phase of the signal $4f$ is adjusted to zero again.

If, in contrast with what is described above, the switching signal at the output 69 of the state detection circuit 71 becomes zero in the period x and one in the period $x+1$, then the signal at the output 55 of the inequality detection circuit 15 will alternately become zero and one, and the control loop comprising the analogue-to-digital converter 3, the inequality detection circuit 15, the filter 85, 87, 89, 90 and the pulse generator 9 will not be capable of operation in the correct phase until the correct switching signal occurs again. Further details will be given in the description of the state detection circuit 71. The alternately occurring zero and one signals at the output 55 are applied via a filter formed by a resistor 92 and a capacitor 93, and via a Schmitt-trigger circuit 95 to an EXCLUSIVE-OR gate 97 and to a delay circuit 99, which has a time delay of one horizontal deflection period, the output of which is connected to a further input of the EXCLUSIVE-OR gate 97. The delay circuit 99 is in the form of a D-flip-flop which, by way of clock signal, receives from an input 100 the same signal which is applied to the input 49 of the inequality detection circuit 15 and has a value 0 only during the occurrence of the burst and the value 1 between two consecutive bursts, also in the field blanking period if no burst is present. In response thereto, always immediately after the burst, the inequality detection circuit output signal, which is somewhat delayed by the filter 92, 93 and the Schmitt-trigger circuit 95 is stored in the D-flip-flop 99 until the next burst period. Now the EXCLUSIVE-OR gate 97 applies a one-signal at the occurrence of a zero and a one value which alternate from deflection period to deflection period, to an input 101 of the state detection circuit 71. Hereinafter, the signal at this input 101 will be designated signal e.

The input 100 of the circuit is connected to an input 103 of the state detection circuit 71 and applies thereto the above-described signal which will be designated g' hereinafter.

The signal coming from the output 27 of the comparator 19, which has the one value if r>s and will be denoted c hereinafter, is applied to a further input 105 of the state detection circuit 71. This signal is used to distinguish the locked or pulled-in state from the state in which no burst is received.

In addition, the state detection circuit 71 supplies a signal k at an output 107, which is applied to a colour killer signal output 109 of the circuit and to a switching signal input 111 of a switch 113. Consequently, in the non-pulled-in state of the control loop, the resistor 85 is by-passed by means of the switch 113.

A pulse signal h, of the horizontal deflection frequency, which has the value one during the horizontal blanking period, is applied to an input 115 of the state detection circuit 71.

Figure 2:
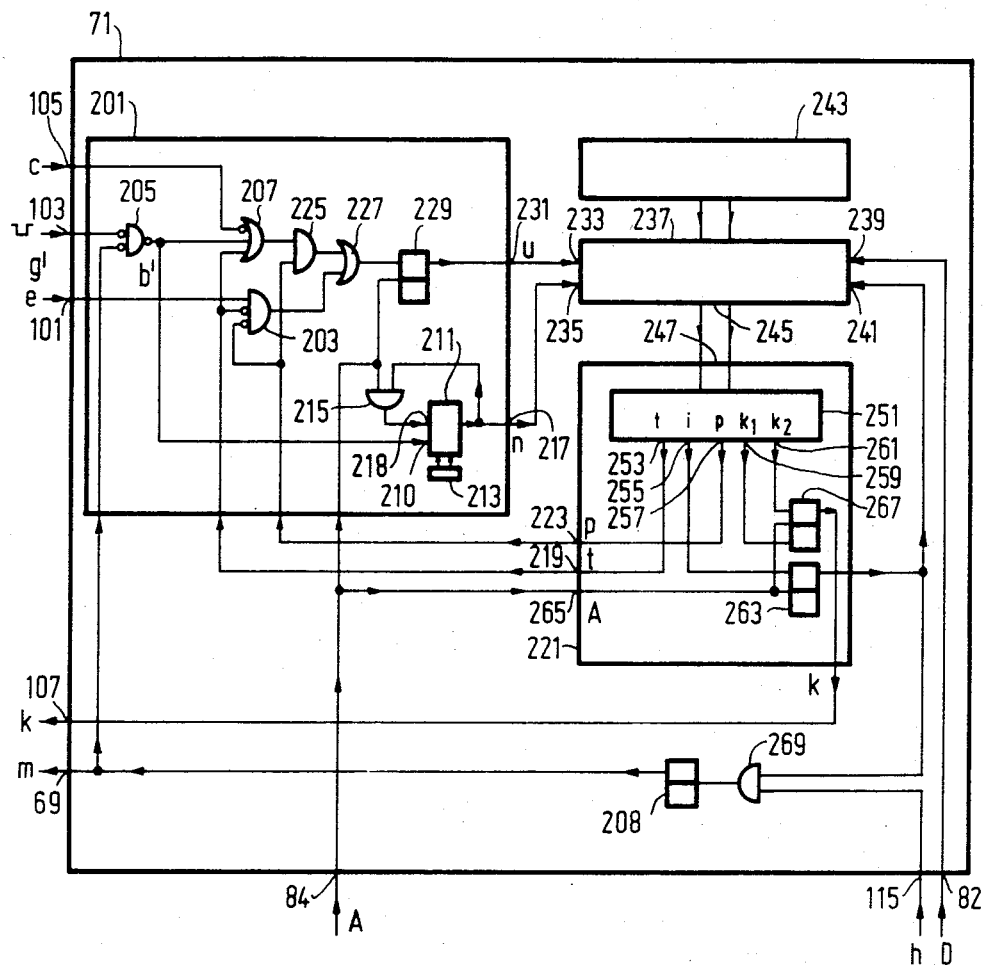
FIG. 2 illustrates by means of a more detailed circuit diagram a portion of the circuit of FIG. 1.

In FIG. 2, which illustrates a possible embodiment of a state detection circuit 71, the same reference numerals are used for components corresponding to those of FIG. 1.

The inputs 101, 103 and 105 also form the inputs of a counter input circuit 201, which comprises an AND-gate 203 an input of which is connected to the input 101, an AND-gate 205 an inverting input of which is connected to the input 103 and an OR-gate 207 an inverting input of which is connected to the input 105 of the state detection circuit. A further, inverting input of the AND-gate 205 is connected to the output of a divide-by-two divider 208 to which also the output 69 which supplies the switching signal m is connected.

The inverting output of the AND-gate 205 is connected to a further input of the OR-gate 207 and to a preset input 210 of an extension circuit which is formed by a counter 211, a preset memory 213 and an AND-gate 215. An output of the counter 211, which becomes one if its counting position differs from zero, supplies from an output 217 of the counting input circuit 201 a signal n which is also applied to an input of the AND-gate 215. The signal A coming from the input 84 of the state detection circuit 71 is applied to the other input of the AND-gate 215. The output of the AND-gate 215 is connected to a counting signal input 218 of the counter 211.

The signal g'+m at the output of the AND-gate 205, which will be designated b' hereinafter, becomes low every alternate deflection period during the burst and causes the counter 211 to take over its presetting value from the preset memory 213, as a result of which the output signal n becomes one. After the burst period has ended, the counter returns to zero in response to the signal nA at its input 218. The signal n at its output 217 then becomes zero again.

A third input of the OR-gate 207 and an inverting input of the AND-gate 203 are connected to an output 219 of a threshold circuit 221 from which a signal t is supplied. A further output 223 of the threshold circuit 221 applies a signal p to a further inverting input of the AND-gate 203 and to an input of an AND-gate 225 a further input of which is connected to the output of the OR-gate 207. The outputs of the AND-gates 203 and 225 are connected to the inputs of an OR-gate 227, the output of which is connected to the input of a D-flip-flop 229 to which the signal A, obtained from the input 84 of the state detection circuit 71, is applied as a clock signal.

An output 231 of the D-flip-flop 229 forms an output of the counter input circuit 201 from which a signal u is supplied.

It can be easily seen that the output signal of the OR-gate 227 is equal to p't'e+p(c'+t+b'). This signal is written into the D-flip-flop 229 by the clock signal A. It comprises information about the accurate state of the switching signal m which is included in the signal e and about the pulled-in state of the control loop present in the signal c. The information in the signal c, if it plays a part in the above-mentioned formula, is stored in the D-flip-flop 229 at the instants $t_4$, $t_8$... in response to the signal A. These instants are the instants at which the result of the comparison of r with s at the instant $t_3$, $t_7$... becomes available at the output 27 of the comparator 19. In the period x+1 this result is one as then, the control loop being pulled-in, $r_x>s_x$ at $t_3$ and $t_7$.

The signals u and n are applied from the output 231 and 217, respectively, of the counter input circuit 201 to an input 233 and 235, respectively, of a counter 237. The signal u at the input 233 determines whether the counter 237 counts up or down, if the signal has the value one the counter 237 counts down, if it has the value zero the counter counts up. The counter 237 is only capable of counting if the signal n at its input 235 is one. The signal D coming from the input 82 and acting as a clock signal is applied to an input 239 of the counter 237 and a signal which causes the counter 237 to assume a position determined by a preset memory 243 is applied to a preset signal input 241.

Connected to an output combination 245 is an input combination 247 of the threshold circuit 221, which input combination at the same time forms an input combination of a level selection circuit 251.

The level selection circuit 251 supplies a signal t, i, p, $k_1$ and $k_2$, resectively, from an output 253, 255, 257, 259 and 261, respectively. The output 253 and 257, respectively, of the level selection circuit 251 is connected to the output 219 and 223, respectively, of the threshold circuit 221. The output 255 of the level selection circuit 251 is connected to the input of a D-flip-flop 263, which receives a signal A as a clock signal from an input 265 which is connected to the input 84 of the state detection circuit 71.

The outputs 259 and 261 of the level selection circuit 251 are connected to the j and k inputs of a jk flip-flop 267 which also receives the signal A as a clock signal from the input 265 of the threshold circuit.

The output of the flip-flop 263 is connected to the preset signal input 241 of the counter 237 and to an input of an AND-gate 269 to a further input of which the signal h coming from the input 115 of the state detection circuit 71 is applied. The output of the AND-gate 269 is connected to the input of the divide-by-two divider 208, which acts as a change-over signal generator. The output of the flip-flop 267 is connected to the output 107 of the state detection circuit 71 and supplies the colour killer and time-constant switching signal k.

Depending on the position of the counter 237 the following signals occur at the outputs of the level selection circuit 251:

output 253:
 t=0 between the minimum and the maximum position
 t=1 on reaching the minimum or the maximum position output 255:
 i=0 below approximately one-sixteenth of the maximum position
 i=1 above this position output 257:

p=0 below approximately one-fourth of the maximum position
p=1 above this position
output 259:
$k_1=1$ below approximately half the maximum position
$k_1=0$ above this maximum position
output 261:
$k_2=0$ below approximately five-eighth of the maximum position
$K_2=1$ above this position.

The position of the counter 237 at which p changes from 0 to one corresponds to the position stored in the preset memory 243.

The operation of the circuit will now be further described on the basis of the signal at the output of the OR-gate 227.

The signal is $p't'e+p(c'+t+b')$.

The counter 237 can only count if the signal n at the output 217 of the counter 211 has the value one.

In response to the operation of the D-flip-flop 229 the signal at the output of the OR-gate 227 is converted into the signal occurring at the output 231 of the counter input circuit 201.

$$u=p't'e+p(c'+t+b').$$

The counter 237 counts up when u=0 and down when u=1. The below schematic survey indicates when this is the case.
The counter 237 counts down (u=1 and n=1) When p=1 and $(c'+t+b')=1$
So at a high counting position and When the control loop is not pulled-in (c'=1) or when the maximum position of the counter 237 has been reached (t=1) or some time after the burst period (b'=1).
  This is a leakage action of the counter 237, which operates as an integrator, in order to prevent the high counting position from being maintained if the burst disappears, when the diodes 51 and 53 in FIG. 1 would be cutoff.
or when p=0 and e=1 and t=0
So at a low counting position and when the divide-by-two divider 208 evidences a faulty switching state (e=1) and the minimum position of the counter 237 has not yet been reached (t=0).
The counter 237 counts up (u=0 and n=1) When p=1 and $(c'+t+b')=0$
So at a high counting position and at a pulled-in control loop (c=1, so c'=0), when the maximum position of the counter 237 has not yet been reached (t=0) during the occurrence of the burst (b'=0) or When p=0 and t'e=0.
So at a low counting position and when the minimum position has been reached (t'=0) or when the switching state of the divide-by-two divider 208 is the correct state (e=0).

From this survey it can be seen that in the non-pulled-in state of the control loop and an incorrect switching state of the divide-by-two divider 208 the counter 237 will count down to its minimum position. When the position i is passed during this count-down the D-flip-flop 263 will supply a zero, as a result of which the AND-gate 269 will become non-conductive. At the same time the position of the counter 237 will be adjusted to the preset value via the input 241, causing i to become one again and the output of the AND-gate 269 to become high again, so that the divide-by-two divider 208 changes state again and is set to the correct switching state. The threshold $k_2$ is then passed and the j-k flip-flop 267 changes state, causing the signal k to become 1 and a colour kill to be eliminated and the time constant of the control loop to be increased because the switch 113 cancels the short-circuit of the resistor 85. The counter 237 now proceeds to its maximum position.

Upon disappearance of the pulled-in state of the control loop or upon drop-out of the burst, the counting position of the counter 237 decreases again and, when the threshold $k_1$ is passed, the j-k flip-flop 267 changes state again, so that the time constant of the control loop is reduced again and the colour killing state is reinstated.

So the state detection circuit 71 has two functions: to detect the state of the control loop and the state of the divide-by-two divider 208, which are realized by means of only one counter 237 acting as an integrator.

If so desired, an integrator in the form of, for example, a counter may of course be used for each of these functions. The colour killing signal can then be taken from an AND-gate connected to the output of the integrators.

It is further possible to use a different type of integrator comprising a counter, or to provide a counterless integrator with a counter.

The state detection circuit 71 may, if so desired, be made operative for each burst by applying, in response to the signal m, alternately the signals A and D to the input 84 and alternately the signals D and C to the input 82. The m input of AND-gate 205 must then be adjusted to the low state so that the AND-gate 205 only functions as a buffer and b' becomes equal to g'.

If so desired, the operation of the state detection circuit can be improved by having the signal e influence the preset value of the preset memory 213.

In order to make the control loop insensitive to noise, the inequality detection circuit 15 is operative for $t_1$, $t_5$, ... in the period x and $t_0$, $t_4$, ... in the period $x+1$ as well as for $t_3$, $t_7$ ... in the period x and $t_2$, $t_6$, ... in the period $x+1$. If less stringent requirements are imposed on the insensitivity to noise, the inequality detection for, for example, $t_3$, $t_7$ ... in the period x and $t_2$, $t_6$ ... in the period $x+1$ may be omitted.

The noise insensitivity of the circuit 95, 97, 99 can be improved by using a hysteresis-free circuit, for example a comparator, instead of the Schmitt-trigger circuit 95 and to apply the output signal of the D-flip-flop 99 to a further D-flip-flop, which is clocked by the signal g' and whose input and output are connected to the inputs of a further EXCLUSIVE-OR-gate. The signal e is then taken via a D-flip-flop clocked by the signal g' from an AND-gate whose inputs are connected to the outputs of the EXCLUSIVE-OR-gate 97 and the additional EXCLUSIVE-OR-gate.

If the circuit is used to process a NTSC-signal the resistor 92, the capacitor 93, the Schmitt-trigger circuit 95, the flip-flop 99, the EXCLUSIVE-OR-gate 97, the input 101 of the AND-gate 203 and consequently also the AND-gate 203 and the OR-gate 227, the divide-by-two divider 208 and the AND-gate 269 are omitted. The input 115 of the state detection circuit 71 is omitted as well as the output 69. The input m of the AND-gate 205 is adjusted to its low state, so that it only serves as a buffer. The time delay of the delay line 21 must then be made equal to an even number of periods of the signal 4f instead of an odd number as with PAL. In addition, the gates 57, 59, 61, 63, 65 and 67 are then omitted, and the signal A is applied to the input 37 of the inequality detection circuit 15 and the signal 2B to the input 47 and the signal C to the input 84 of the state detection circuit 71 and the signal B to the input 82. In addition, instead of the signal i, a signal p' is applied to the input of the D-flip-flop 263.

What is claimed is:

1. A digital colour television signal processing circuit comprising an analogue-to-digital converter which is controlled by a pulse generator producing a pulse signal of four times the chrominance subcarrier frequency, a comparison circuit being coupled to the output of the analogue-to-digital converter for comparing different digital burst samples and for obtaining therefrom a control signal for a phase control loop of the pulse generator, characterised in that the burst samples to be compared are obtained from an input (17) and an output (23) of a delay circuit having such a delay that at a correct pulse generator phase the difference between the burst samples at the input (17) and at the output (23) thereof becomes zero, while the comparison circuit is an inequality detection circuit (15) for detecting independently of the amplitude value of the burst samples inequality of the amplitude value of the burst samples at the input and the output of the delay circuit and converting that inequality, if present, into a control signal (at 91).

2. A digital colour television signal processing circuit as claimed in claim 1, characterized in that coupled to an output (27) of the inequality detection circuit there is a state detection circuit (71) by means of which it can be detected whether the state control loop is in the pulled-in or the non-pulled-in state and in response to an output signal (at 107) a changeover (113) of a time constant (85, 87, 89, 90) can be obtained in the phase control loop (3, 15, 9).

3. A digital colour television signal processing circuit as claimed in claim 2, characterized in that the state detection circuit (71) has a colour killing signal output (109).

4. A digital colour television signal processing circuit as claimed in claim 1 or 2, for processing a PAL-colour television signal, characterized in that an input (101) of the state detection circuit (71) is coupled via a comparison circuit (97, 99) for comparing output signals of the inequality detection circuit (15) occurring in two consecutive horizontal scanning periods at an output (55) of the inequality detection circuit (15) while the state detection circuit (71) comprises a circuit (263, 269) for establishing a correct switching state of a change-over signal generator (208) at half the horizontal scanning frequency.

5. A digital colour television signal processing circuit as claimed in claim 4 for a PAL-colour television signal, characterized in that the delay circuit (21) produces a delay of an odd number of times the period of four times the chrominance subcarrier frequency (4f).

6. A digital colour television signal processing circuit as claimed in any of the claims 1 to 3, inclusive for a NTSC colour television signal, characterized in that the delay circuit (21) produces a delay of an even number of times the period of four times the chrominance subcarrier frequency (4f).

* * * * *